US006811913B2

(12) United States Patent
Ruhl

(10) Patent No.: US 6,811,913 B2
(45) Date of Patent: Nov. 2, 2004

(54) MULTIPURPOSE REVERSIBLE ELECTROCHEMICAL SYSTEM

(75) Inventor: Robert C. Ruhl, Cleveland Heights, OH (US)

(73) Assignee: Technology Management, Inc., Cleveland, OH (US)

( * ) Notice: Subject to any disclaimer, the term of this patent is extended or adjusted under 35 U.S.C. 154(b) by 472 days.

(21) Appl. No.: 09/992,272

(22) Filed: Nov. 14, 2001

(65) Prior Publication Data

US 2002/0058175 A1 May 16, 2002

Related U.S. Application Data

(60) Provisional application No. 60/249,098, filed on Nov. 15, 2000.

(51) Int. Cl.[7] .............................. H01M 8/10; H01M 2/08
(52) U.S. Cl. .......................................... 429/32; 429/35
(58) Field of Search ............................... 429/30, 31, 32, 429/34, 35

(56) References Cited

U.S. PATENT DOCUMENTS 4,770,955 A    9/1988   Ruhl ........................... 429/33

| 5,198,310 A | 3/1993 | Fleming et al. ................ 429/17 |
| 5,340,664 A | 8/1994 | Hartvigsen .................... 429/20 |
| 5,492,777 A | 2/1996 | Isenberg et al. ............... 429/17 |
| 5,733,675 A | 3/1998 | Dederer et al. ................ 429/19 |

FOREIGN PATENT DOCUMENTS

| EP | 0 466 418 | 1/1992 |
| WO | WO 98/12764 | 3/1998 |

*Primary Examiner*—Patrick Ryan
*Assistant Examiner*—Thomas H. Parsons
(74) *Attorney, Agent, or Firm*—D. Peter Hochberg; Sean Mellino; Katherine R. Vieyra

(57) ABSTRACT

A reversible electrochemical system adapted to operate between a fuel cell mode, an electrolysis mode, and an electrolysis and fuel cell alternating mode(energy storage mode), operating on a fuel gas mixture and an oxygen-containing gas mixture. In the fuel cell mode, a current of electrons is delivered to an oxygen electrode where their charge is transferred to a plurality of oxygen ions which are passed through an electrolyte to a fuel electrode where the charge is transferred back to the electrode. In the electrolysis mode, a current of electrons is sent to a fuel electrode where the charge is transferred to a plurality of oxygen ions formed by the decomposition of steam. The oxygen ions pass through an electrolyte to an oxygen electrode where the charge is transferred back to the electrons.

17 Claims, 1 Drawing Sheet

MULTIPURPOSE REVERSIBLE ELECTROCHEMICAL SYSTEM

CROSS REFERENCE TO RELATED APPLICATION

This application claims priority of U.S. Provisional Application No. 60/249,098, filed Nov. 15, 2000, under Title 35, United States Code, Section 119(e).

FIELD OF THE INVENTION

The present invention relates generally to electrochemical systems, such as solid-oxide electrolyte fuel cells and fuel cell assemblies for directly converting chemical energy into electricity. More particularly, the present invention relates to a reversible fuel cell system having a plurality of functional modes, including a fuel cell mode, an electrolysis mode, and an electrical energy storage mode.

DESCRIPTION OF THE PRIOR ART

Planar, or flat, solid oxide fuel cell stacks are well known in the industry. Generally, a fuel cell is an electrochemical device which combines a fuel such as hydrogen with oxygen to produce electric power, heat and water. The solid oxide fuel cell consists of an anode, a cathode and an electrolyte. The anode and cathode are porous, thus allowing gases to pass through them. The electrolyte, located between the anode and cathode, is permeable only to oxygen ions as they pass from the cathode to the anode. The passing of the oxygen ions through the electrolyte creates an excess of electrons on the anode side to complete an electrical circuit through an external load to the cathode side, which is electron deficient.

A solid oxide fuel cell is very advantageous over conventional power generation systems. It is known in the industry that such devices are capable of delivering electric power with greater efficiency and lower emissions as compared to engine-generators.

Known planar solid oxide fuel cell stacks utilize a forced flow of gases through their electrodes. Furthermore, they employ fuel and air flow designs so that all, or at least many, of the cells are fed the same fuel and air compositions. The stacks are capable of producing good, but not optimal efficiencies. Furthermore, the stacks tend to exhibit significant local flow differences amongst cells and within cells. This can lead to increased stack performance degradation and a reduced stack efficiency. Further still, the stacks may require significant pressure drops, and therefore compression power, for the flowing gases.

Solid oxide electrolyzers are also known, which use input electric power to electrolyze steam into hydrogen and oxygen. Some types of known fuel cell stacks are capable of operation in either the fuel cell or electrolysis modes, while other technologies require separate stacks for fuel cell and electrolysis operation. A combination fuel cell/electrolyzer system can be used for electrical energy storage, using steam, hydrogen, and oxygen.

U.S. Pat. No. 4,770,955 (Ruhl) discloses a hollow planar solid oxide fuel cell employing forced fuel flow through each anode, with all anodes fed essentially the same fuel composition.

U.S. Pat. No. 5,198,310 (Fleming et al.) discloses a process for thermal management by feed gas conditioning in high temperature fuel cell systems wherein at least a portion of a fuel feed stream is chemically reacted in an exothermic chemical reaction in an external zone. The external zone is thermally separated from the fuel cell system and at least a portion of the products of the exothermic chemical reaction are passed to an internal zone in thermal exchange with the fuel cell system and reacted in an endothermic chemical reaction.

U.S. Pat. No. 5,340,664 (Hartvigsen) provides a thermally integrated heat exchange system for solid oxide electrolyte systems, which includes a thermally insulated furnace enclosure structure having an internal chamber therein and a plurality of solid oxide electrolyte plates disposed within the internal chamber.

U.S. Pat. No. 5,492,777 (Isenberg et al.) discloses an electrochemical energy conversion and storage system for storing electrical energy as chemical energy and recovering electrical energy from stored chemical energy. The solid oxide electrolyte electrochemical cell is operated in two modes: an energy storage mode and an energy recovery mode.

U.S. Pat. No. 5,733,675 (Dederer et al.) discloses an electrochemical fuel cell generator having an internal and leak tight hydrocarbon fuel reformer.

European Patent No. 0 466 418 A1 (Ishihara et al.) discloses a solid oxide fuel cell and porous electrode for use with the fuel cell. The use of the porous electrode with the fuel cell improves the surface contact density at the interface while maintaining low resistance to gas diffusion in the electrode, enhancing power output.

A significant hurdle is that known combination fuel cell/electolyzer systems are capable of energy storage efficiencies no better than about 30%–40% energy in/energy out. Moreover, most such systems must use separate electrochemical stacks for fuel cell and electrolysis modes, thus adding to cost and complexity.

Thus, there is an unsatisfied need to have a reversible system using a single set of stacks for fuel cell and electrolysis modes and capable of achieving high fuel cell, electrolysis, and energy storage efficiencies.

SUMMARY OF THE INVENTION

The present invention is an electrochemical system being adapted to incorporate three different operating modes.

It is an object of the present invention to provide an electrochemical system having a fuel cell mode, and electrolysis mode, and an energy storage (reversible) mode.

It is another object of the present invention to provide an electrochemical system having an energy storage (reversible) mode that alternates between a fuel cell mode and an electrolysis mode, operating on hydrogen/steam mixtures and oxygen.

It is yet another object of the present invention to provide an electrochemical system that is a reversible system using a single set of stacks, or a plurality of stacks, for fuel cell and electrolysis modes and capable of achieving high fuel cell, electrolysis, and energy storage efficiencies.

The system of the present invention is designed to be capable of being used in several various modes of operation. The first is a fuel/air fuel cell mode wherein power is generated. Propane is used as an example of a fuel which contains both hydrogen and carbon, but similar operation can be achieved with other hydrocarbons and with oxygenates, including methanol, ethanol, biogas, gasifier gas and landfill gas, provided that certain impurities such as particulates and metals are removed.

In this mode, syngas, which consist mainly of hydrogen, water, carbon monoxide and carbon dioxide, is produced in a reformer from propane and steam and heated using surplus heat from the stack(s). Hot syngas, also called hot fuel gas, is fed to a fuel manifold at a controlled flow rate. Hot air is fed to a hot air manifold at a controlled flow rate. When the external electrical circuit is closed, the cell stack generates electric power from the electrochemical combination of fuel and oxygen molecules. Oxygen from the air diffuses inwards in each oxygen electrode, via gaseous diffusion. Fuel molecules, hydrogen and carbon monoxide, diffuse outwards and water and carbon dioxide molecules diffuse inwards within the fuel cell electrode, also via gaseous diffusion. Secondary non-electrochemical reactions also occur both in the fuel electrode and in the fuel manifold. These include the water-gas shift reaction represented by the equation:

$$CO+H_2O(g) \rightarrow CO_2+H_2$$

and the steam reforming of residual hydrocarbons represented by the equation:

$$CH_4+H_2O(g) \rightarrow CO_2+3H_2.$$

As the syngas and air flow through their manifolds past the cell stack, the fuel becomes progressively oxidized and the air becomes progressively depleted of oxygen. The cell operating voltages will vary along the stack based upon the chemical potential of the local fuel and oxidizer compositions. This allows high total stack voltage and hence high stack efficiencies. By selecting stack operating conditions properly, electrochemical fuel utilizations up to 100% are possible, especially when using oxygen-tolerant fuel electrodes at the fuel exit end of the stack. High fuel utilization also boosts efficiencies.

During fuel/air operation, incoming air is partially preheated and serves to remove excess heat from the stack, thereby allowing control of cell stack operating temperature for an unlimited duration.

A second mode is an electrolysis mode. In this mode, liquid water is vaporized and then electrolyzed using an electric power input to produce hydrogen and oxygen for storage or other uses.

A third mode is the alternating operation of electrolysis mode with a hydrogen/oxygen fuel cell mode to comprise a highly efficient electrical energy storage system. A hot thermal mass is used to absorb excess heat produced in the fuel cell mode for later release during the electrolysis mode, via a temperature swing of the hot thermal mass. Another thermal mass absorbs excess heat from spent fuel cooling in fuel cell mode for later use in electrolysis mode to help preheat the feeds. Electric heaters are employed as needed to prevent the thermal mass temperature from falling below a preset limit during extended periods of low-power electrolysis.

The system is also capable of operation on various other fuel/oxidizer combinations.

The multipurpose reversible electrochemical system of the present invention provides various advantages over fuel cells and electrolyzers of the prior art. For example, the cell stacks of the present invention do not require close matching of electrodes, nor having to tailor them for low forced-gas pressure drops. Systems may be operated with low fuel and air supply pressures, thus minimizing costs and energy consumption for blowers, etc.

DETAILED DESCRIPTION OF THE PREFERRED EMBODIMENTS

Figure 1:
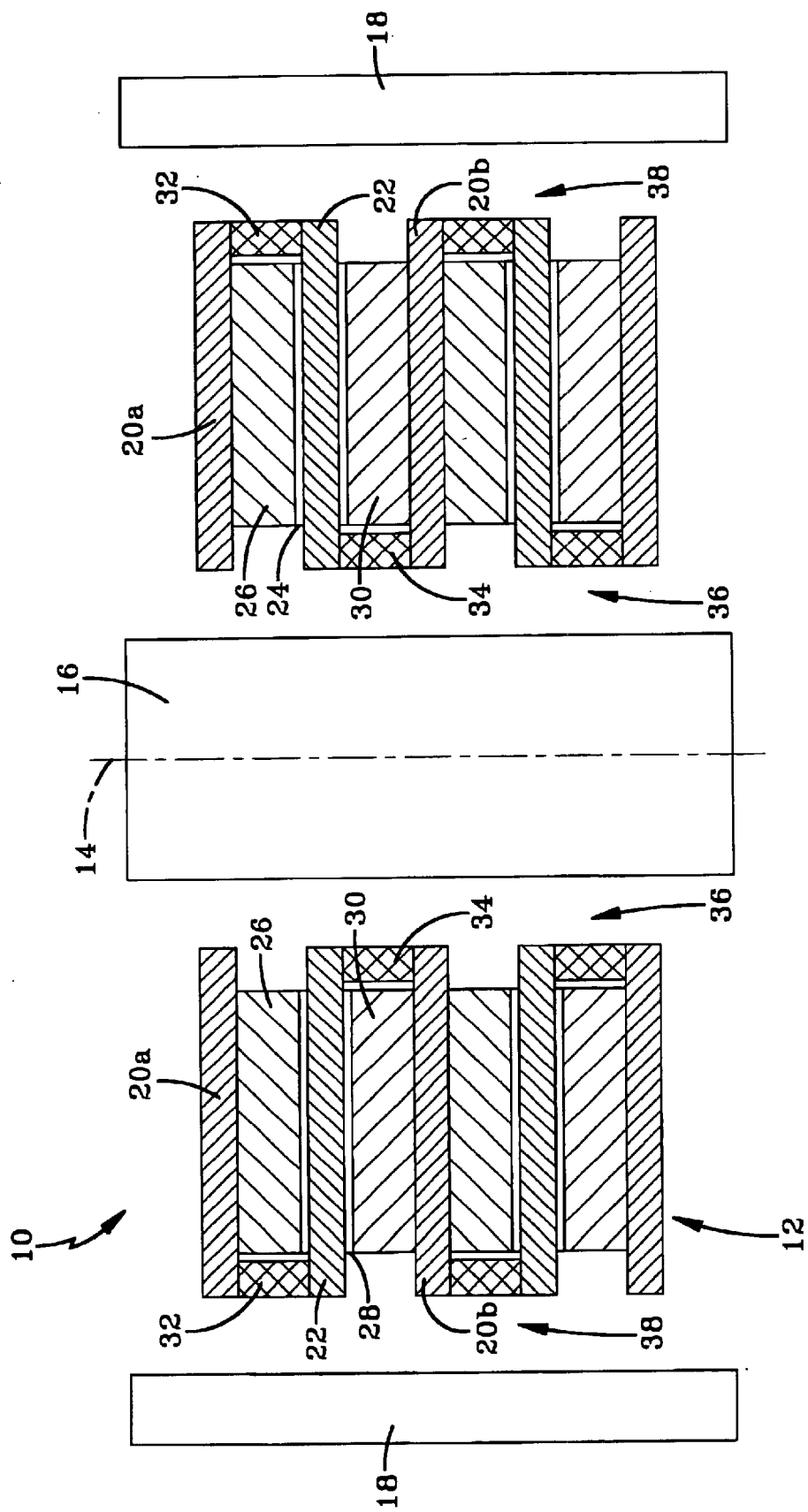
FIG. 1 is a cross section of two adjacent, identical cells contained in a stack of such cells of the system of the present invention.

The present invention is now described with reference to the drawing, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Referring now to FIG. 1, a cross section showing a single hollow circular cell 10 contained in a stack 12 of like cells of the system of the present invention is shown. It is noted that for purposes of explanation, the present invention is described as being circular, however the system of the present invention may also be employed with electrochemical systems of any shape used in the art, such as rectangular, square, or ovoid. It is also noted that FIG. 1 shows two adjacent cells having like elements. For purposes of explanation, stack 12 is referred to as having just one cell 10, however any numbers of cells 10 may be employed in stack 12. A cylinder centerline 14 is also shown. Cells 10 are defined by a hollow cavity in the center of cell 10. In alternative embodiments, the center of cell 10 can be defined by any number of hollow cavities. A center cylinder 16 is located inside stack 12 and defines a hollow cylindrical passage 36 which is adapted to provide a fuel to electrochemical stack 12 from a fuel source. An oxidizer tube 18 is also adjacent to electrochemical stack 12 and provides a source of oxygen or air to electrochemical stack 12. Both center cylinder 16 and oxidizer tube 18 comprise a ceramic material, such as mullite, or a high-temperature metal alloy, such as Inconel.

Each cell 10 is separated from and electrically connected to adjacent cells by separator discs 20a and 20b. Each cell 10 contains only one separator disc 20a, the second separator disc 20b being a separator of an adjacent cell. Inside each cell 10 is an electrolyte disc 22. A fuel electrode 24 abuts electrolyte disc 22 directly above electrolyte disc 22. A fuel diffusion layer 26 is positioned between the fuel electrode 24 and separator 20a. An oxygen electrode 28 abuts electrolyte disc 22 directly below electrolyte disc 22. An oxygen diffusion layer 30 is positioned between the oxygen electrode 28 and separator 20b. Both fuel diffusion layer 26 and oxygen diffusion layer 30 are highly porous and sufficiently thick so as to allow the requisite gases to diffuse through them with only moderate composition gradients. It is noted that all components represented in FIG. 1, other than the diffusion layers 26 and 30 of cell 10, are essentially impervious to all gases.

A fuel electrode annular seal 32 surrounds fuel electrode 24 and diffusion layer 26. Seal 32 extends from first separator 20a to electrolyte disc 22. The upper end of seal 32 is substantially flush with first separator 20a. The lower end of seal 32 is substantially flush with electrolyte disc 22. An oxygen electrode annular seal 34 is located inside oxygen electrode 28 and diffusion layer 30. Seal 34 extends from electrolyte disc 22 to second separator 20b. The upper end of seal 34 is substantially flush with electrolyte disc 22. The lower end of seal 34 is substantially flush with second separator 20b.

Separators 20a and 20b can be made of any material common in the field, such as a high-temperature alloy which forms a thin protective oxide surface layer with good high-temperature electrical conductivity. Electrolyte disc 22 may be of yttria-stabilized zirconia, or any other suitable material. Fuel electrode 24 and fuel diffusion layer 26 can be of, for example, a doped ceria/nickel mixture. Nickel foam may be used for diffusion layer 26 except in cells operating on fuel mixtures with very high oxygen potentials. Oxygen electrode 28 and diffusion layer 30 can be of, for example, strontium-doped lanthanum manganite. Seals 32 and 34 can be made from a suitable glass. A thin layer of ink, such as an ink made from a finely-divided electrode composition, may be applied on each side of separators 20. Ink is applied to improve the electrical contact between the components of cell 10.

Between center cylinder 16 and stack 12 is a hollow cylindrical space comprising the stack fuel manifold 36. Between stack 12 and oxidizer tube 18 is a hollow cylindrical space comprising the hot oxidizer manifold 38. The distances between the stack 12 and tubes 16 and 18 are kept small to minimize the distances for gaseous diffusion, but large enough to prevent any physical contact between stack and tubes.

Referring now to stack 12, the plurality of oxygen electrodes 28 can be operated on pure oxygen gas in either an electrolysis mode or energy storage mode. When pure oxygen gas is employed, the oxygen will flow within the plurality of oxygen diffusion layers 30 due to very slight pressure gradients. When the plurality of oxygen electrodes 28 are being operated on air, oxygen concentration gradients are created within oxygen diffusion layers 30, thus producing gaseous diffusion transport of oxygen. During all modes, fuel gas species concentration gradients are created within fuel diffusion layers 26, thus producing gaseous diffusion transport of the species that are present, such as $H_2$, $H_2O$, CO, $CO_2$, or $CH_4$.

During fuel cell mode operation, a current of electrons arrives at oxygen electrode 28, which transfers their charge to oxygen ions. The oxygen ions pass through electrolyte 22 (which has good oxygen ion conductivity, but very low electronic conductivity) to fuel electrode 24, which transfers their charge back to electrons, which are conducted to the next cell. The oxygen reacts with fuel species at fuel electrode 24 to produce $H_2O$ and, when carbon is present, $CO_2$. Stack 12 consists of a plurality of series-connected cells 10, thus producing an operating stack voltage which is the sum of all the cell voltages. The same electric current flows through the entire stack.

During electrolysis mode operation, a current of electrons arrives at fuel electrode 24, which transfers their charge to oxygen ions formed by decomposing steam into hydrogen. The oxygen ions pass through electrolyte disc 22 to oxygen electrode 28. Oxygen electrode 28 transfers their charge to electrons and liberates oxygen gas. The electrons are conducted to the next cell 10.

During energy storage mode, stack 12 alternates between fuel cell mode (operating on hydrogen fuel and oxygen) and electrolysis mode (producing hydrogen and oxygen from steam).

Fuel manifold 36 and oxygen manifold 38 act to minimize the diffusion distances required for the gas species and to implement the progressive reaction of the gas mixtures by creating "plug flow" of gas from cell to cell along the stack. The progressive reaction of fuel by a large number of cells enables higher stack efficiencies in both fuel cell and electrolysis modes, since each cell can operate at a different voltage based upon the local gas composition (fuel-rich cells at higher voltages). The direction of air flow (when air is being used) may be in either direction relative to fuel flow. In some embodiments, progressive reaction of fuel only is desired, with all cells being exposed to similar oxygen concentrations.

Typically, stack 12 is operated at a temperature between about 800° C. and 1000° C. The preferred thicknesses of the diffusion layers 26 and 30 will depend upon the active electrochemical area per cell and the maximum currents desired: larger areas and larger currents prefer thicker diffusion layers to minimize concentration differences between the inside and outside of the electrodes.

Fuel cell, electrolysis, and energy storage systems may have one or multiple stacks 12. Each stack 12 may have up to hundreds of cells 10, or any particular amount of cells 10 suitable for the particular task of stack 12. Each stack 12 requires electric current contacts on each end and may also optionally have intermediate current taps within stack 12, with the successive sub-stacks between each pair of current taps normally having alternating electrical polarities (orientations). Individual cells 10 or groups of cells 10 may also be fitted with voltage sensing wires to allow monitoring of cells 10 for control purposes. Multiple stacks 12 may be electrically connected in various series and/or parallel combinations for the desired current/voltage characteristics. In systems having multiple stacks 12, the fuel gas stream may be routed to each stack 12 in succession to maximize the advantage of progressive fuel conversion. However, there is usually little benefit in such a routing of air.

Calculations have shown that fuel cell systems of this invention using common hydrocarbon fuels such as propane could theoretically achieve conversion efficiencies (propane lower heating value/electric power) up to over 80%. Other calculations on steam electrolyzer systems of this invention could theoretically achieve conversion efficiencies (hydrogen higher heating value/electric power) up to over 95%. These efficiencies are higher than prior art.

For energy storage mode operation, the energy storage efficiency may be improved by utilizing thermal energy storage. When a storage system is operated in energy generation (fuel cell) mode, the chemical energy liberated by fuel oxidation exceeds the electrical energy available from the stacks. This excess energy may be stored as hot (e.g. circa 900° C.) thermal energy by allowing stacks 12 and their associated hot components to rise in temperature (for example, by up to 100° C.). In systems where large energy storage capacities are desired, additional hot thermal mass may be added (for example, alumina shapes) in the vicinity of stacks 12. When the storage system is later recharged during electrolysis mode, the required stack electrical energy input is smaller than the chemical energy needed to decompose hot steam. This energy shortfall may be obtained by allowing the temperature of the hot thermal mass to fall. Supplemental electric heaters can ensure that stack 12 temperatures remain above a low set point during very long periods of electrolysis or idling. Similarly, at least some of the thermal energy liberated by cooling the exhaust and condensing the steam produced during fuel cell power generation mode may be stored as moderate temperature (e.g. circa 100° C., depending upon pressure) thermal energy for recovery during electrolysis mode recharging by helping to vaporize liquid water and preheat the feed to the stacks.

Heat balance calculations for systems with thermal storage have shown that solid oxide energy storage systems which employ water condensation could achieve energy storage efficiencies up to at least 80%. Energy storage systems which maintain their water as vapor could achieve energy storage efficiencies up to at least 90%. These efficiencies are higher than prior art.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. It would be evident to one familiar with the art that the cells of the system of the present invention need not be identical. The object of the present invention may be performed with a system not having like cells, or cells of varying thicknesses in a single system or even comprising varying materials in a single system. Accordingly, the present invention is intended to embrace all such alterations, combinations, modifications, and variations that fall within the spirit and scope of the appended claims.

What is claimed is:

1. An electrochemical system adapted to operate between a fuel cell mode, an electrolysis mode, and a mode alternating between said electrolysis mode and said fuel cell mode operating on a fuel gas mixture and an oxygen-containing gas mixture, said system comprising:

at least one hollow planar cell arranged to form an electrochemical stack, said stack including an electrical contact structure at each end of said stack;

an electronically conductive, substantially impervious, hollow planar separator for separating each cell from an adjacent cell within said stack and electrically connecting each cell to an adjacent cell;

a hollow planar, substantially impervious, electrolyte within each cell;

a hollow planar fuel electrode contacting said electrolyte, said electrode being on one side of the electrolyte;

a hollow planar oxygen electrode contacting said electrolyte and on the opposite side of electrolyte from said fuel electrode;

an electronically conductive fuel diffusion layer contacting said fuel electrode, said fuel diffusion layer adapted to allow fuel and oxidized fuel transport via gaseous diffusion between the edge of said layer and said fuel electrode;

an electronically conductive oxygen diffusion layer contacting said oxygen electrode, said oxygen diffusion layer adapted to allow oxygen transport via gaseous diffusion between the edge of said layer and said oxygen electrode;

a first seal preventing said oxygen-containing gas mixture from accessing said fuel electrode and said fuel diffusion layer; and a second seal preventing said fuel gas mixture from accessing said oxygen electrode and said oxygen diffusion layer.

2. An electrochemical system of claim 1 wherein said oxygen-containing gas mixture is substantially pure oxygen.

3. The electrochemical system of claim 1 wherein said oxygen electrode is operated on pure oxygen gas in either of said electrolysis mode or said alternating mode, said pure oxygen gas flowing within said oxygen diffusion layer due to a substantially slight pressure gradient.

4. The electrochemical system of claim 1 wherein said at least one cell has a shape selected from the group consisting of circular, square, rectangular and oval.

5. The electrochemical system of claim 1 wherein said fuel gas mixture comprises steam and hydrogen in each of said modes.

6. The electrochemical system of claim 1 wherein said at least one hollow planar cell is defined by at least one cavity.

7. The electrochemical system of claim 1 further including an additional electrical contact layer applied to at least one side of said separator to improve the electrical contact between the components of said at least one cell.

8. The electrochemical system of claim 7 wherein said additional electrical contact layer is ink comprising finely-divided electrode composition.

9. The electrochemical system of claim 1 further including at least one supplemental high temperature mass positioned adjacent to said stack and used in combination with said stack during a temperature rise for storing high temperature thermal energy released during said fuel cell mode for later release and during a temperature fall of electrolysis mode for reducing the electrical energy input for electrolysis.

10. The electrochemical system of claim 9 wherein said at least one supplemental mass is used to store during a temperature rise a portion of thermal energy released during cooling of a spent fuel stream from operation of said fuel cell mode for later use and during a temperature fall for helping heat said fuel gas mixture of said electrolysis mode to reduce the electrical energy input for electrolysis.

11. The electrochemical system of claim 1 wherein said fuel gas mixture flows past each cell substantially in succession thereby performing progressive reaction of said fuel gas mixture and enabling higher conversion efficiency.

12. A process for a planar electrochemical system adapted to operate between a fuel cell mode, an electrolysis mode, and a mode alternating between said electrolysis mode and said fuel cell mode, said alternating mode also being an energy storage system mode, wherein operation in said fuel cell mode comprises sending a current of electrons to an oxygen electrode to cause said oxygen electrode to transfer the charge of said electrons to a plurality of oxygen ions, diffusing said oxygen ions into said oxygen electrode via gaseous diffusion and preventing any fuel-gas mixture from accessing said oxygen electrode by a seal provided around said oxygen electrode to cause said oxygen ions to pass through an electrolyte to a fuel electrode via gaseous diffusion and preventing any gas mixture containing oxygen from accessing said fuel electrode by a seal provided around said fuel electrode, to cause said fuel electrode to transfer said charge back to said electrons, and to cause said electrons to be transferred to an adjacent cell of said system, said cells separated by a substantially impervious, hollow planar separator; wherein operation in said electrolysis mode comprises sending a current of electrons to a fuel electrode to cause said fuel electrode to transfer the charge of said electrons to a plurality of oxygen ions, said oxygen ions being formed by the decomposition of steam into hydrogen, to cause said oxygen ions to pass through an electrolyte to an oxygen electrode via gaseous diffusion to cause said oxygen electrode to transfer the charge of said oxygen ions to said electrons, and to cause said electrons to be conducted to an adjacent cell, separating each of said cells by a substantially impervious, hollow planar separator; and wherein operation in said energy storage mode comprises alternating said system between said electrolysis mode and said fuel cell mode.

13. The fuel cell system of claim 12 wherein said fuel gas mixture flows past each cell substantially in succession thereby performing progressive oxidation of said fuel gas mixture and enabling higher conversion efficiency.

14. A solid-oxide fuel cell system adapted to operate on a fuel gas mixture and an oxygen-containing gas mixture, said system comprising:

at least one hollow planar cell arranged to form a fuel cell stack, said stack including an electrical contact structure at each end of said stack;

an electronically conductive, substantially impervious, hollow planar separator for separating each cell from an adjacent cell within said stack and electrically connecting each cell to an adjacent cell;

a hollow planar, substantially impervious, electrolyte within each cell;

a hollow planar fuel electrode contacting said electrolyte on one side of said electrolyte;

a hollow planar oxygen electrode contacting said electrolyte and on the opposite side of electrolyte from said fuel electrode;

an electronically conductive fuel diffusion layer contacting said fuel electrode, said fuel diffusion layer adapted to allow fuel and oxidized fuel transport via gaseous diffusion between the edge of said layer and said fuel electrode;

an electronically conductive oxygen diffusion layer contacting said oxygen electrode, said oxygen diffusion layer adapted to allow oxygen transport via gaseous diffusion from the edge of said layer to said oxygen electrode;

a first seal preventing said oxygen-containing gas mixture from accessing said fuel electrode and said fuel diffusion layer; and a second seal preventing said fuel gas mixture from accessing said oxygen electrode and said oxygen diffusion layer.

15. The fuel cell system of claim 14 wherein said at least one cell has a shape selected from the group consisting of circular, square, rectangular and oval.

16. The fuel cell system of claim 14 further including an additional electrical contact layer applied to at least one side of said separator to improve, the electrical contact between the components of said at least one cell.

17. The fuel cell system of claim 16 wherein said additional electrical contact layer is ink comprising finely-divided electrode composition.

* * * * *